Patented June 2, 1925.

1,540,649

UNITED STATES PATENT OFFICE.

FREDERICK B. POWER, OF WASHINGTON, DISTRICT OF COLUMBIA, AND VICTOR K. CHESNUT, OF HYATTSVILLE, MARYLAND.

BAIT ATTRACTIVE TO THE COTTON-BOLL WEEVIL.

No Drawing. Application filed September 24, 1924. Serial No. 739,690.

*To all whom it may concern:*

Be it known that we, FREDERICK B. POWER and VICTOR K. CHESNUT, citizens of the United States of America, and employees of the Department of Agriculture, residing in Washington, D. C., and Hyattsville, Maryland, respectively, whose post-office address is Bureau of Chemistry, Department of Agriculture, Washington, D. C., have invented a bait attractive to the cotton-boll weevil involving the employment of certain volatile constituents of the cotton plant as attracters, of which the following is a specification.

It is well known that the destruction caused by the cotton-boll-weevil amounts annually to many millions of dollars, and the prevention of such an enormous loss to the cotton crop through the depredations of this insect has therefore become one of the most important economic problems. The chief method that has thus far been successfully employed for mitigating this evil consists in dusting the cotton plants with calcium arsenate and the use of this poisonous compound in the quantities required involves a very great expense.

Inasmuch as the cotton plant possesses a peculiar attraction for the so-called boll-weevil it has been considered that this must be due to an odor exhaled by the plant. Investigations were consequently undertaken to ascertain the nature of the odorous constituents. This prolonged and difficult research has resulted in the isolation of a number of definite compounds, and the field tests thus far made have established the fact that some of these compounds possess a particular attraction for the boll-weevil.

In carrying out our invention we employ certain volatile constituents of the cotton plant as agents for attracting insects and especially the boll-weevil. These substances, used either singly or in combination, may be mixed with an insecticide or may be used with or without an insecticide in connection with insect trapping devices. The function of the substances obtained from the cotton plant, or synthetic substances representing them, is to attract the boll-weevil, and the insecticide or the insect trapping devices are to destroy or catch the boll-weevil. They include such compounds as are obtained or obtainable from the cotton plant; namely, the methylamines; esters of organic acids, such as formic, acetic, and caproic acids; aldehydes, such as acetaldehyde and vanillin; and substances belonging to the class of terpenes. Any or all of the compounds enumerated above as occurring in the cotton plant may be prepared by synthetical methods.

We claim:

1. A bait attractive to the cotton boll weevil comprising substances chemically identical with the volatile constituents of the cotton plant.

2. A bait attractive to the cotton boll weevil comprising substances chemically identical with the volatile aliphatic amine constituents of the cotton plant.

FREDERICK B. POWER.
VICTOR K. CHESNUT.